US009581778B2

(12) United States Patent
O'Day et al.

(10) Patent No.: US 9,581,778 B2
(45) Date of Patent: Feb. 28, 2017

(54) OPTICAL FIBER CABLES HAVING MULTIPLE SUBUNIT CABLES

(71) Applicant: Corning Optical Communications LLC, Hickory, NC (US)

(72) Inventors: Michael Paul O'Day, Southlake, TX (US); James Arthur Register, III, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 254 days.

(21) Appl. No.: 14/444,219

(22) Filed: Jul. 28, 2014

(65) Prior Publication Data

US 2014/0334786 A1 Nov. 13, 2014

Related U.S. Application Data

(63) Continuation of application No. 13/660,242, filed on Oct. 25, 2012, now Pat. No. 8,824,846, which is a continuation of application No. PCT/US2011/034315, filed on Apr. 28, 2011.

(60) Provisional application No. 61/330,057, filed on Apr. 30, 2010.

(51) Int. Cl.
*G02B 6/44* (2006.01)

(52) U.S. Cl.
CPC ......... *G02B 6/4417* (2013.01); *G02B 6/4495* (2013.01); *G02B 6/441* (2013.01); *G02B 6/4416* (2013.01)

(58) Field of Classification Search
CPC ..... G02B 6/4417; G02B 6/441; G02B 6/4495
See application file for complete search history.

(56) References Cited

U.S. PATENT DOCUMENTS

| 4,575,184 | A | * | 3/1986 | Ueno | G02B 6/4416 106/18.11 |
| 4,659,174 | A | * | 4/1987 | Ditscheid | G02B 6/4402 174/113 AS |
| 4,687,294 | A | * | 8/1987 | Angeles | G02B 6/443 174/121 A |
| 5,224,192 | A | * | 6/1993 | Wagman | G02B 6/443 385/109 |

(Continued)

FOREIGN PATENT DOCUMENTS

| IL | WO 2007036938 A2 * | 4/2007 | ............ D07B 1/005 |
| WO | WO 2009/050533 A1 | 4/2009 | ............... G02B 6/44 |

OTHER PUBLICATIONS

Patent Cooperation Treaty, International Search Report and Written Opinion for International Application No. PCT/US2011/034315; Mailing Date Jul. 4, 2011—13 pages.

(Continued)

*Primary Examiner* — Rhonda Peace
(74) *Attorney, Agent, or Firm* — William D. Doyle

(57) ABSTRACT

Micromodule cables include subunit, tether cables having both electrical conductors and optical fibers. The subunits can be stranded within the micromodule cable jacket so that the subunits can be accessed from the micromodule cable at various axial locations along the cable without using excessive force. Each subunit can include two electrical conductors so that more power can be provided to electrical devices connected to the subunit.

19 Claims, 3 Drawing Sheets

(56) References Cited

U.S. PATENT DOCUMENTS

| | | | |
|---|---|---|---|
| 5,268,971 A | 12/1993 | Nilsson et al. | 385/101 |
| 5,495,547 A | 2/1996 | Rafie et al. | 385/101 |
| 5,657,410 A * | 8/1997 | Fehn | G02B 6/4401 |
| | | | 385/100 |
| 5,703,983 A | 12/1997 | Beasley, Jr. | 385/104 |
| 5,822,485 A * | 10/1998 | Nelson | G02B 6/4479 |
| | | | 385/109 |
| 5,913,003 A | 6/1999 | Arroyo et al. | 385/101 |
| 6,049,647 A | 4/2000 | Register et al. | 385/101 |
| 6,236,789 B1 | 5/2001 | Fitz | 385/101 |
| 6,249,628 B1 | 6/2001 | Rutterman et al. | 385/106 |
| 6,249,629 B1 * | 6/2001 | Bringuier | G02B 6/4433 |
| | | | 385/101 |
| 6,301,414 B1 | 10/2001 | Liese et al. | 385/103 |
| 6,363,192 B1 | 3/2002 | Spooner | 385/101 |
| 6,424,768 B1 | 7/2002 | Booth et al. | 385/102 |
| 6,738,547 B2 | 5/2004 | Spooner | 385/101 |
| 6,922,511 B2 | 7/2005 | Rhoney et al. | 385/106 |
| 7,206,481 B2 * | 4/2007 | Quinn | G02B 6/4495 |
| | | | 112/113 |
| 7,272,282 B1 | 9/2007 | Seddon et al. | 385/106 |
| 7,627,218 B2 | 12/2009 | Hurley | 385/101 |
| 7,783,147 B2 * | 8/2010 | Sutehall | G02B 6/4422 |
| | | | 385/101 |
| 8,600,205 B2 | 12/2013 | Hurley et al. | |
| 8,824,846 B2 * | 9/2014 | Register, III | G02B 6/4417 |
| | | | 385/101 |
| 8,861,911 B2 * | 10/2014 | Shin | G02B 6/4416 |
| | | | 385/101 |
| 8,879,877 B2 * | 11/2014 | Keller | G02B 6/4486 |
| | | | 385/103 |
| 8,929,702 B2 * | 1/2015 | Varkey | G02B 6/4416 |
| | | | 385/100 |
| 9,201,204 B2 * | 12/2015 | Risch | G02B 6/44 |
| 2003/0099443 A1 | 5/2003 | Karnik et al. | 385/76 |
| 2004/0002559 A1 * | 1/2004 | Troutman | C09D 5/185 |
| | | | 524/100 |
| 2008/0289851 A1 * | 11/2008 | Varkey | G02B 6/4416 |
| | | | 174/115 |
| 2009/0041413 A1 | 2/2009 | Hurley | 385/101 |
| 2012/0213483 A1 | 8/2012 | Risch et al. | 385/113 |
| 2013/0051741 A1 * | 2/2013 | Register, III | G02B 6/4417 |
| | | | 385/101 |
| 2014/0334786 A1 * | 11/2014 | O'Day | G02B 6/4495 |
| | | | 385/101 |

OTHER PUBLICATIONS

Anonymous, "Reversed oscillating lay radiused slot distribution cable," Sep. 1, 1999, *Research Disclosure*, vol. 425, No. 13; XP007124759, ISSN: 0374-4353.

\* cited by examiner

OPTICAL FIBER CABLES HAVING MULTIPLE SUBUNIT CABLES

RELATED APPLICATIONS

This application is a continuation of U.S. patent application Ser. No. 13/660,242 filed on Oct. 25, 2012, which is a continuation of International Application No. PCT/US11/34315 filed Apr. 28, 2011, which claims the benefit of priority to U.S. Application No. 61/330,057, filed Apr. 30, 2010, the content of each of which is relied upon and incorporated herein by reference in its entirety, and the benefit of priority under 35 U.S.C. §120 is hereby claimed.

This application is related to U.S. application Ser. No. 11/891,008, filed Aug. 8, 2007, now U.S. Pat. No. 7,627,218, and to PCT/US09/66401, filed Dec. 2, 2009, the entire contents of which are hereby incorporated by reference.

SUMMARY

According to a first embodiment a micromodule cable comprises a cable jacket and at least three subunit cables surrounded by and in contact with the cable jacket and SZ stranded together. Each subunit cable comprises a subunit jacket having a cavity; a micromodule cable disposed within the subunit jacket, the micromodule cable comprising a plurality of optical fibers surrounded by a micromodule jacket; a longitudinally extending strength member disposed within the jacket; a first electrical conductor disposed within the jacket; and a second electrical conductor disposed within the jacket.

The micromodule cable can be accessed by cutting the micromodule cable jacket at a first location; severing a first subunit cable at the first location; cutting the cable jacket at a second location a distance of at least 0.7 meter from the first location; and pulling the first subunit cable out of the cable jacket. The first subunit cable can then serve as a "tether" and provide electrical and optical data connectivity to a remote device located along the length of the micromodule cable. Each subunit cable can be accessed at a different axial location along the micromodule cable and connected to remote devices. Alternatively, multiple subunit cables can be accessed at the same location to connect to multiple devices.

According to one aspect, each subunit includes a pair of electrical conductors so that additional power can be provided to remote devices. The micromodule cable, including the subunit cables, can be constructed of selected materials and in selected dimensions so that the micromodule cable passes selected burn and voltage requirements.

BRIEF DESCRIPTION OF THE DRAWINGS

The present invention is illustrated and described herein with reference to the various drawings, in which like reference numbers are used to denote like system/assembly components and/or method steps, as appropriate, and in which.

DETAILED DESCRIPTION

Figure 1:
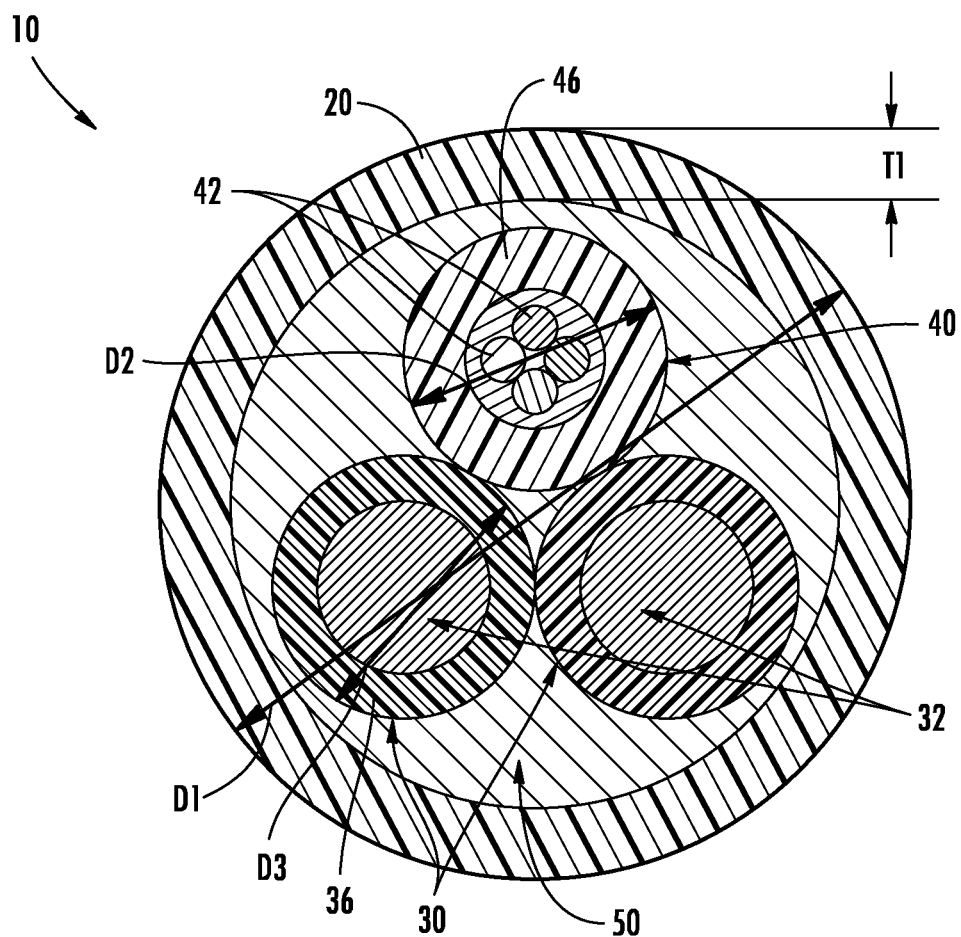
FIG. 1 is cross-sectional view of a hybrid subunit cable according to a first embodiment.

FIG. 1 is a cross-sectional view of a subunit or "tether" cable 10 according to a present embodiment. The subunit cable, or simply "subunit" 10 includes a polymer cable jacket 20 surrounding a pair of insulated conductors 30, and a micromodule cable, or simply "micromodule" 40. The insulated conductors 30 each include a metallic conductor 32 surrounded by insulation 36. The micromodule 40 includes a plurality of optical fibers 42 surrounded by a polymer jacket 46. A tensile strength member 50, such as one or more longitudinally extending aramid yarns, can be included in the cavity of the jacket 20. The jackets 30, 46 can be formed primarily from polymer materials, and can be generally referred to as "polymeric." In this specification, the term "polymer" includes materials such as, for example, copolymers, and polymer materials including additives such as fillers.

The exemplary subunit 10 has a jacket 20 with a wall thickness T1 in the range of 0.3-0.5 mm, such as about 0.4 mm, and is constructed of plenum PVC which is adequate to pass NFPA-262 testing and to meet ICEA-596 mechanical requirements. A thin riser PVC is used for the insulation 36 of the conductors 30. Thin wall insulation 36, with a thickness in the range of 0.007-0.013 mm, facilitates passing burn tests. The exemplary insulation 36 has a thickness of about 0.010 mm. A thicker jacket 20 may be utilized to make the cable 10 more robust and to account for thicker insulation on the conductors 30. The aramid yarn 50 serves to prevent jacket to conductor tacking and also provides tensile strength. The diameter D1 of the subunit 10 can be in the range of 4-4.5 mm, the diameter D2 of the micromodules 40 can be in the range of 1.3-1.7 mm, and the diameter D3 of the conductors 30 can be in the range of 1.3-1.7 mm. The conductors 30 can be from 18-22 AWG. In the exemplary embodiment, the diameter D1 is about 4.25 mm, the diameter D2 is about 1.5 mm, and the diameter D3 is about 1.5 mm.

Figure 2:
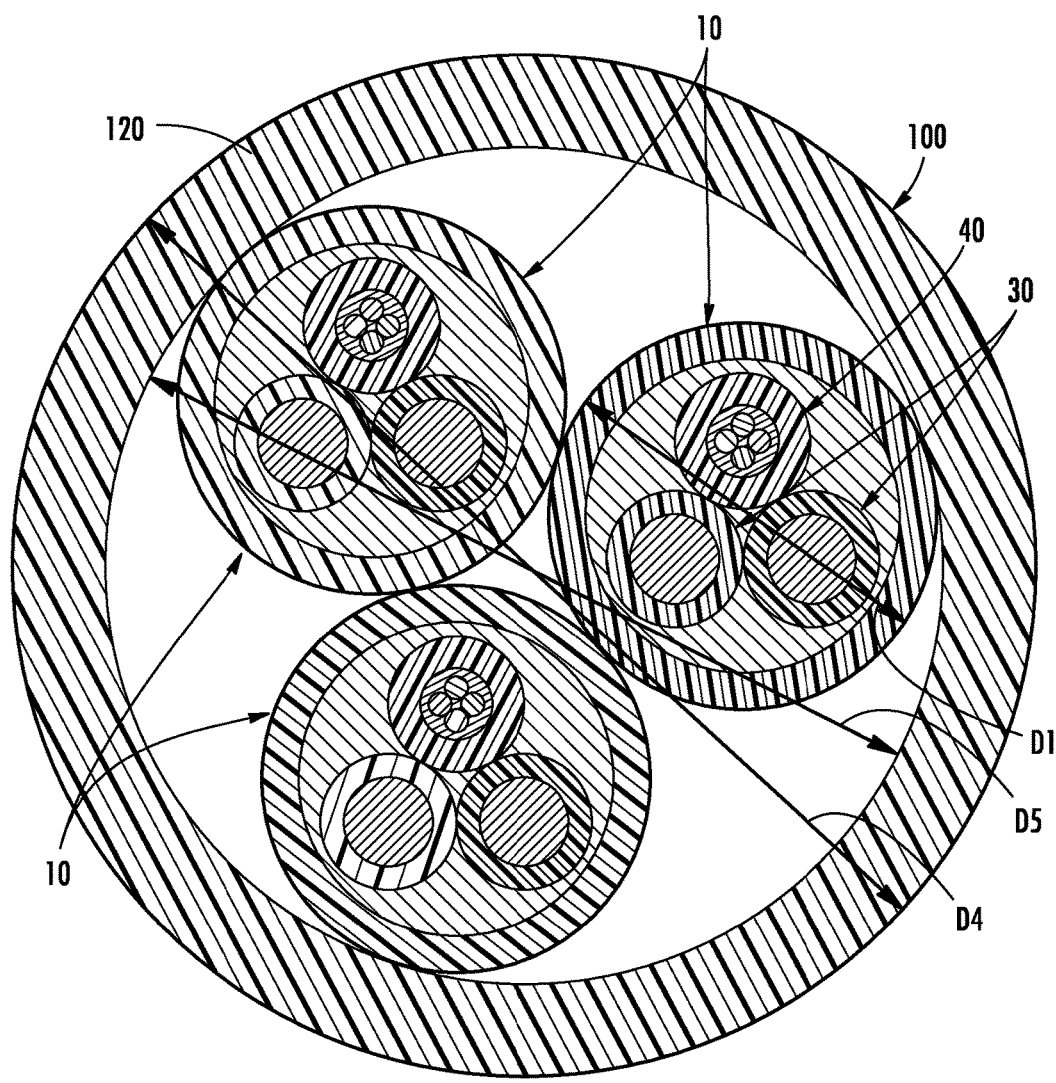
FIG. 2 is cross-sectional view of a micromodule cable including multiple subunit cables as shown in FIG. 1.

FIG. 2 is a cross-sectional view of a micromodule or "array" cable 100 that includes a plurality of the subunits 10. The exemplary micromodule cable 100 includes a cable jacket 120 surrounding three subunits 10, although additional subunits 10 could be incorporated into the micromodule cable 100.

According to one application, the micromodule cable 100 can be used to provide power and data to multiple remote antenna units (RAU) in a radio-over-fiber (RoF) system. Other electronic devices could also be connected by the cable 100. The micromodule cable 100 can be plenum-rated, with the subunits 10 including four optical fibers 42 for transmitting data and two, 20 AWG conductors 30 for transmitting electrical power, and data, if desired. The number of optical fibers can be increased or decreased in the micromodules. Multiple pairs of conductors 30 can be included in each subunit 10 to power additional devices. The jacket 120 of the micromodule cable 100 and the jackets 20 of the subunits 10 can be made from fire-retardant materials, such as, for example, highly-filled PVC. Use of fire-retardant materials can be selected so that the micromodule cable 100 can pass the National Fire Protection Association (NFPA) 262 burn test so as to achieve plenum burn rating. Zero halogen materials can alternatively be used. The exemplary micromodule cable 100 is Class 2 Plenum Cable (CL2P) Rated for low voltage applications, which allows the cable 100 to be installed with less stringent installation procedures.

Within the subunits 10, the micromodules 40 can be SZ stranded with the conductors 30. The subunits 10 can then be helically or SZ stranded within the micromodule cable jacket 120. A layer of talc may be applied over the subunits 10 to reduce friction when accessing the subunits 10 in the cable 100. The micromodule cable 100 can be constructed for use in parallel optics systems and having low skew within the subunits 10. The micromodule cable 100 can have an outside diameter D4 in the range of 10.5-11.6 mm, and an inside diameter D5 in the range of 8.7-9.5 mm. The exemplary cable 110 has an outside diameter D4 of about 11.15 mm and an inside diameter D5 of about 9.15 mm.

Figure 3:
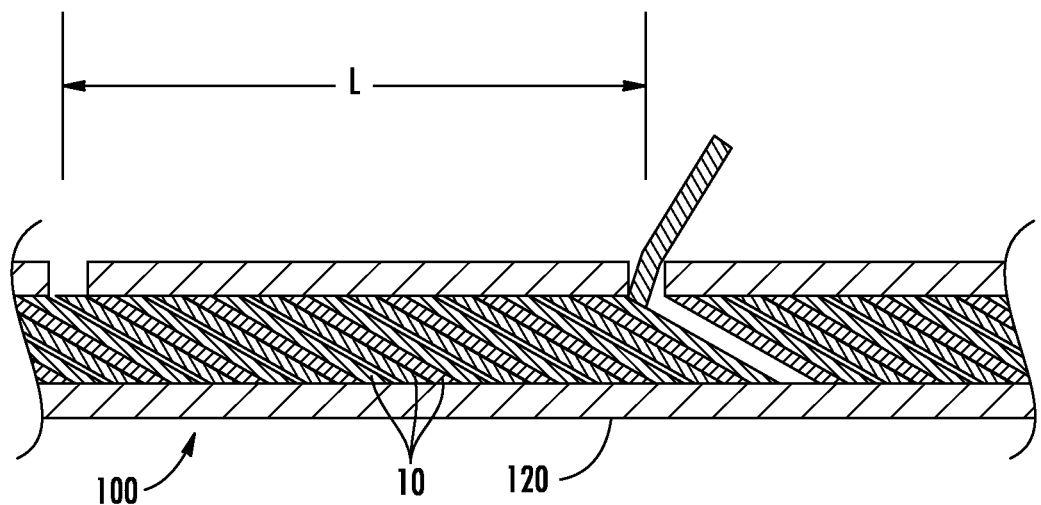
FIG. 3 illustrates a method of accessing the subunit cables within the micromodule cable of FIG. 2.

FIG. 3 is a longitudinal cross-section illustrating a method of accessing individual subunits or "tether" cables 10 in the cable 100. According to one aspect of the present embodiment, a cut can be made in the jacket 120 at a first location (to the right in FIG. 3) where the desired subunit 10 that needs to be accessed can be severed. The cable jacket 120 can be cut a second location (to the left in FIG. 3) a distance L from the first location, where the subunit 10 can be pulled from the cable jacket 120. The subunits 10 can be color-coded so that the severed subunit 10 can be easily identified. The severed subunit 10 may then be pulled out a distance approximately equal to the distance L and terminated to a remote antenna unit or some other remote electronic device. The cable 100 is constructed so that at a length L of least 0.7 m, a subunit 10 can be removed when stranded at a 450 mm pitch using a tensile force of ≤20 N. Longer lengths may also be removed with up to 2.0 m being accessed at higher tensile forces.

The subunits 10 can be broken out of the micromodule cable 100 for connection to external electronics, such as remote antenna units. In this context, the micromodule cable 100 is commonly referred to as an "array" or "tail" cable. The subunits 10 are referred to as "tether" cables. If the distance from the micromodule cable 100 to a remote device such as an RAU is too great, a subunit 10 may be connected to a separate tether cable of longer length that is used to connect to the RAU. The separate tether cable may be of identical construction to the subunits 10. Tether cables can be used to extend the distance the RAUs are positioned from the array cable 100 by a typical distance of 1-10 m.

The remaining subunits 10 can be accessed using the same procedure at different longitudinal positions along the micromodule cable 100. The subunits can each be connected to one or more electronic devices.

As disclosed, the micromodule cable 100 can satisfy scalable power and optical data connectivity to one or more remote RAUs, using one or more power supply units for DC power. A single cable 100 can connect to multiple RAUs arranged in series, avoiding the need to pull multiple array cables. The cable 100 allows easy access to the micromodules 40 and to the conductors 30, with each conductor 30 being individually accessible at any access point. A significant length (e.g., 0.7 m or more) of each subunit 10 can be accessed, as shown in FIG. 3, to allow significant optical 42 fiber and power conductors 30 for termination—either directly to a remote device, or to a separate tether cable. If the RAU is close enough to the array cable 100, a subunit 10 accessed from the cable 100 may connect directly to the RAU.

Bend enhanced optical fibers can be utilized to allow smaller lighter tether and subunit 10 designs to meet ICEA-596 requirements for crush. Examples of suitable optical fibers for use in the cables disclosed in this application include single and multi-mode optical fibers, such as optical fibers available from Corning Incorporated under the trademarks InfiniCor®, SMF-28®, Vascade®, SMF-28e®, ClearCurve®, and LEAF®.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A hybrid cable, comprising:
    only one fiber optic micromodule, the fiber optic micromodule comprising a micromodule jacket surrounding one or more bend-enhanced optical fibers, wherein the micromodule jacket comprises a fire-retardant material, and wherein the one or more bend-enhanced optical fibers comprise at least four optical fibers;
    only two electrical conductors, wherein the electrical conductors are a first electrical conductor and a second electrical conductor, wherein the electrical conductors are metallic conductors, and wherein the electrical conductors are each insulated;
    a cable jacket having a cavity, wherein the micromodule and the first and second electrical conductors are disposed within the cable jacket; and
    tensile strength members included in the cavity of the cable jacket such that the tensile strength members fill the cavity not occupied by the fiber optic micromodule and the first and second electrical conductors.

2. The cable of claim 1, wherein the tensile strength members comprise one or more aramid yarns.

3. The cable of claim 1, wherein the one or more optical fibers consist of four optical fibers.

4. The cable of claim 1, wherein the one or more optical fibers are multi-mode bend-enhanced optical fibers.

5. The cable of claim 1, wherein, when viewed in cross-section, the first and second electrical conductors contact one another.

6. The cable of claim 5, wherein, when viewed in cross-section, the fiber optic micromodule contacts the first electrical conductor, and the fiber optic micromodule also contacts the second electrical conductor.

7. The cable of claim 1, wherein, when viewed in cross-section, the fiber optic micromodule and electric conductors fill more of the area of the cavity of the cable jacket than the tensile strength members.

8. A hybrid cable, comprising:
    only one fiber optic micromodule, the fiber optic micromodule comprising a micromodule jacket surrounding one or more bend-enhanced optical fibers, wherein the micromodule jacket comprises a fire-retardant material, and wherein the one or more bend-enhanced optical fibers comprise at least four optical fibers;
    a first electrical conductor and a second electrical conductor, wherein the electrical conductors are metallic conductors, and wherein the electrical conductors are each insulated, wherein, when viewed in cross-section, the first and second electrical conductors contact one another, and wherein, when viewed in cross-section, the fiber optic micromodule contacts the first electrical conductor, and the fiber optic micromodule also contacts the second electrical conductor;
    a cable jacket having a cavity, wherein the micromodule and the first and second electrical conductors are disposed within the cable jacket; and
    tensile strength members included in the cavity of the cable jacket such that the tensile strength members fill the cavity not occupied by the fiber optic micromodule and the first and second electrical conductors.

9. The cable of claim 8, wherein the tensile strength members comprise one or more aramid yarns.

10. The cable of claim 8, wherein the one or more optical fibers consist of four optical fibers.

11. The cable of claim 8, wherein the one or more optical fibers are multi-mode bend-enhanced optical fibers.

12. The cable of claim 8, wherein, when viewed in cross-section, the fiber optic micromodule and electric conductors fill more of the area of the cavity of the cable jacket than the tensile strength members.

13. A hybrid cable, comprising:
   only one fiber optic micromodule, the fiber optic micromodule comprising a micromodule jacket surrounding one or more bend-enhanced optical fibers, wherein the micromodule jacket comprises a fire-retardant material;
   only two electrical conductors, wherein the electrical conductors are a first electrical conductor and a second electrical conductor, wherein the electrical conductors are metallic conductors, and wherein the electrical conductors are each insulated;
   a cable jacket having a cavity, wherein the micromodule and the first and second electrical conductors are disposed within the cable jacket; and
   tensile strength members included in the cavity of the cable jacket such that the tensile strength members fill a portion of the cavity not occupied by the fiber optic micromodule and the first and second electrical conductors, wherein the tensile strength members comprise one or more aramid yarns, wherein, when viewed in cross-section, the fiber optic micromodule and electric conductors fill more of the area of the cavity of the cable jacket than the tensile strength members.

14. The cable of claim 13, wherein the one or more bend-enhanced optical fibers comprise at least four optical fibers.

15. The cable of claim 14, wherein the one or more optical fibers consist of four optical fibers.

16. The cable of claim 14, wherein the one or more optical fibers are multi-mode bend-enhanced optical fibers.

17. The cable of claim 13, wherein, when viewed in cross-section, the first and second electrical conductors contact one another.

18. The cable of claim 17, wherein, when viewed in cross-section, the fiber optic micromodule contacts the first electrical conductor.

19. The cable of claim 18, wherein, when viewed in cross-section, the fiber optic micromodule also contacts the second electrical conductor.

* * * * *